B. F. UNDERWOOD.
SEWER GAS-TRAP.
No. 179,881. Patented July 18, 1876.
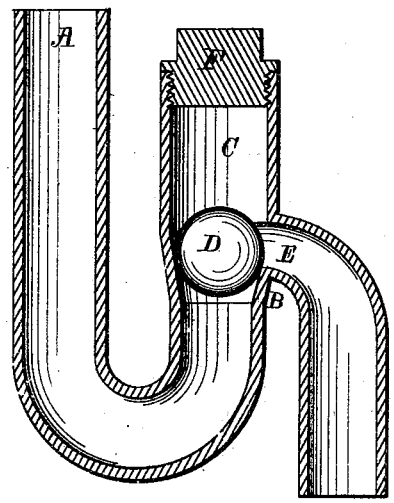
Witnesses:
Inventor:

UNITED STATES PATENT OFFICE.

BENONI F. UNDERWOOD, OF BROOKLYN, NEW YORK, ASSIGNOR TO C. TITUS THAYER, OF SAME PLACE.

IMPROVEMENT IN SEWER-GAS TRAPS.

Specification forming part of Letters Patent No. 179,881, dated July 18, 1876; application filed February 18, 1876.

*To all whom it may concern:*

Be it known that I, BENONI F. UNDERWOOD, of the city of Brooklyn, county of Kings and State of New York, have invented a new and useful Improvement in Valve-Traps, which improvement is fully set forth in the following specification, reference being had to the accompanying drawing.

The object of my invention is the construction of a valve-trap fitted with a ball-valve for the prevention of the return of sewer-gas, which valve will so act as to give an unobstructed passage of the full capacity of the trap.

This trap consists of a descending pipe, A, making a short curve and ascending an inch or more of the same diameter B, then obliquely enlarging to produce a slightly greater diameter, C, then extending upward of the increased diameter to a height equal to one and a half time the diameter, the end being closed by a screw-plug, having an oval opening placed within and above the oblique portion for the outlet of said trap, this opening being of the same capacity as pipe A, the trap fitted with a ball-valve, composed of wood boiled in paraffine, E, the oblique portion forming a seat therefor, and the upward extension allowing the ball to rise above the opening F, thus providing a clear outlet for the escape of the fluid and semi-fluid contents of soil-pipes, &c.

I claim as my invention—

The combination of a pipe with an oblique enlargement, an upward extension having an oval opening placed within and above the oblique portion of the pipe for the outlet of said trap, substantially as shown and described.

BENONI F. UNDERWOOD.

Witnesses:
 WALTER HUTTON,
 L. E. WOOD.